United States Patent
Syed et al.

(10) Patent No.: US 7,216,729 B2
(45) Date of Patent: May 15, 2007

(54) METHOD AND SYSTEM OF REQUESTING ENGINE ON/OFF STATE IN A HYBRID ELECTRIC VEHICLE

(75) Inventors: Fazal U. Syed, Canton, MI (US); Ryan A. McGee, Ann Arbor, MI (US); Joseph W. Anthony, Lytle, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 10/605,290

(22) Filed: Sep. 19, 2003

(65) Prior Publication Data

US 2005/0061563 A1    Mar. 24, 2005

(51) Int. Cl.
*B60K 6/04* (2006.01)

(52) U.S. Cl. ................ 180/65.2; 903/941; 903/943

(58) Field of Classification Search ............ 180/65.2, 180/65.3, 65.4; 903/941, 943; 701/22
See application file for complete search history.

(56) References Cited

U.S. PATENT DOCUMENTS

| | | | |
|---|---|---|---|
| 5,080,448 A | | 1/1992 | Mori et al. |
| 5,285,862 A | * | 2/1994 | Furutani et al. ........... 180/65.4 |
| 5,808,448 A | | 9/1998 | Naito |
| 5,842,534 A | * | 12/1998 | Frank ....................... 180/65.2 |
| 6,116,363 A | * | 9/2000 | Frank ....................... 180/65.2 |
| 6,158,537 A | | 12/2000 | Nonobe |
| 6,554,088 B2 | * | 4/2003 | Severinsky et al. ........ 180/65.2 |
| 6,570,266 B1 | | 5/2003 | Wakashiro et al. |
| 6,583,599 B1 | | 6/2003 | Phillips et al. |
| 6,603,215 B2 | * | 8/2003 | Kuang et al. ............. 290/40 C |
| 6,694,232 B2 | * | 2/2004 | Saito et al. ................. 701/22 |
| 6,739,418 B2 | * | 5/2004 | Ogata et al. ............... 180/65.2 |
| 6,781,251 B2 | * | 8/2004 | Takaoka et al. ........... 180/65.2 |
| 2002/0019687 A1 | | 2/2002 | Suzuki et al. |
| 2002/0175657 A1 | | 11/2002 | Leboe |

FOREIGN PATENT DOCUMENTS

| | | |
|---|---|---|
| EP | 0 698 522 B1 | 3/2000 |
| EP | 0 744 314 B1 | 9/2000 |
| EP | 1 077 149 A2 | 2/2001 |

\* cited by examiner

*Primary Examiner*—Frank Vanaman
(74) *Attorney, Agent, or Firm*—David B. Kelley; Brooks Kushman, P.C.

(57) ABSTRACT

A method and system of engine start/stop control for a HEV that monitors the battery and requests a specific engine state based on condition of the battery. A battery parameter such as discharge power limit (DPL) or state of charge (SOC) is compared with a set of threshold levels including a MIN level, an ON level, and an OFF level and the result of the comparison provides inputs to a state machine. The state machine includes an ON state, an OFF state and a OPPORTUNISTIC state. The machine transitions between the various states as a function of DPL and SOC relative to the sets of threshold levels.

5 Claims, 2 Drawing Sheets

METHOD AND SYSTEM OF REQUESTING ENGINE ON/OFF STATE IN A HYBRID ELECTRIC VEHICLE

BACKGROUND OF INVENTION

1. Field of the Invention

The invention relates to hybrid electric vehicles and more particularly to a strategy for requesting an engine ON or OFF state based on the condition of the vehicle battery.

2. Background Art

The need to reduce fossil fuel consumption and pollutants from automobiles and other vehicles powered by internal combustion engines (ICEs) is well known. Vehicles powered by electric motors have attempted to address these needs. However, electric vehicles have limited range and limited power coupled with the substantial time needed to recharge their batteries. An alternative solution is to combine both an ICE and an electric traction motor into one vehicle. Such vehicles are typically called hybrid electric vehicles (HEV's).

The HEV has been described in a variety of configurations. Some HEV systems require the operator to select between electric and internal combustion engine operation. In other configurations the electric motor drives one set of wheels and the ICE drives a different set. Other, more useful, configurations have developed. A series hybrid electric vehicle (SHEV) is a vehicle with an engine (most typically an ICE), which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), battery, and electric motor combined to provide torque to power the wheels of the vehicle. A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provide torque output. In this configuration, torque output can come from either source or both simultaneously. The vehicle braking system can also deliver torque to drive the generator to charge the battery (regenerative braking).

A desirable result of combining the ICE with an electric motor is that the ICE's fuel consumption and pollutants are reduced with no appreciable loss of performance or vehicle range. One of the benefits of the parallel HEV configurations is that the engine can be turned off during periods of low or no power demand from the driver (e.g., waiting for a traffic light) which improves fuel economy by eliminating wasted fuel used during idle conditions. The motor can then be used primarily to propel the vehicle under conditions of low power demand. In some configurations, the engine can be disconnected from the motor and powertrain when it is not running by opening a disconnect clutch. As power demand increases, the engine can be restarted and reconnected to provide the requested torque.

The two power sources in a PSHEV work together seamlessly with a common gear system to meet the driver demand for power without exceeding the power limits of the powertrain, including the limits of the battery subsystem. A vehicle system controller performs the coordination function in this split power powertrain. Under normal operating conditions, the vehicle system controller interprets the driver's demand for power as a function of acceleration or deceleration demand. It then determines when and how much torque each power source needs to provide to the transmission to meet the driver's power demand and to achieve specified vehicle performance (i.e., engine fuel economy, emission quality, driveability, etc.). The vehicle system controller determines the operating point of the engine torque and speed relationship.

In a hybrid electric vehicle with engine start/stop capability a battery controller may limit the maximum discharge power for various reasons. For example if the battery discharge limit becomes too low there may not be enough battery power available to start the engine. Also, when the vehicle is in reverse, the generator operates at a higher speed. Under such circumstances more battery power is required in order to start the engine.

SUMMARY OF INVENTION

In accordance with the present invention a method and system of engine start/stop control for a HEV is provided that monitors the battery and requests a specific engine state based on the present state of the engine and a parameter of the battery. In one embodiment of the invention, the parameter is battery discharge power limit (DPL) and is computed in real-time as a function of battery state of charge (SOC), battery resistance, battery temperature, battery voltage, battery OCV, and battery life. Battery discharge power limit is the amount of power that can be used from the battery. Thus, if the battery discharge power limit is 10 kilowatts, the vehicle is allowed to use 10 kilowatts. In another embodiment, the parameter battery SOC is monitored as a proxy for battery discharge power limit on the assumption that battery discharge power limit will decrease with a decrease in battery SOC. In both embodiments the battery parameter is compared with a set of threshold levels including a MIN level, an ON level, and an OFF level and the result of the comparison provides inputs to a state machine. Preferably, different sets of threshold levels are provided depending upon whether the HEV transmission is in a forward drive mode or a reverse drive mode to account for the higher battery power needed to start the engine while in reverse.

If the battery discharge power limit drops below a certain level it may be necessary to start the engine in order to charge the battery since otherwise it may not be possible to start the engine at all. However, under many circumstances it may be desirable to charge the battery when that is not so critical as in the above example. Under these circumstances it is desirable to wait and see if the engine is started for other reasons, such as driver demand being greater than can be supplied by the battery capability. If the engine is running it may be desirable to inhibit the shutting down of the engine so that the battery can be returned to a high SOC or high discharge power limit. This "wait and see" strategy or opportunistic mode of operation is incorporated in the present invention and has the effect of reducing engine cycling thereby increasing fuel economy while ensuring that the battery will always have enough energy to spin the engine to it's desired speed when the engine is not making positive torque (such as during start-stop).

Other objects and features of the present invention will become apparent when viewed in light of the following detailed description of a preferred embodiment when taken in conjunction with the attached drawings and appended claims.

DETAILED DESCRIPTION

Figure 1:
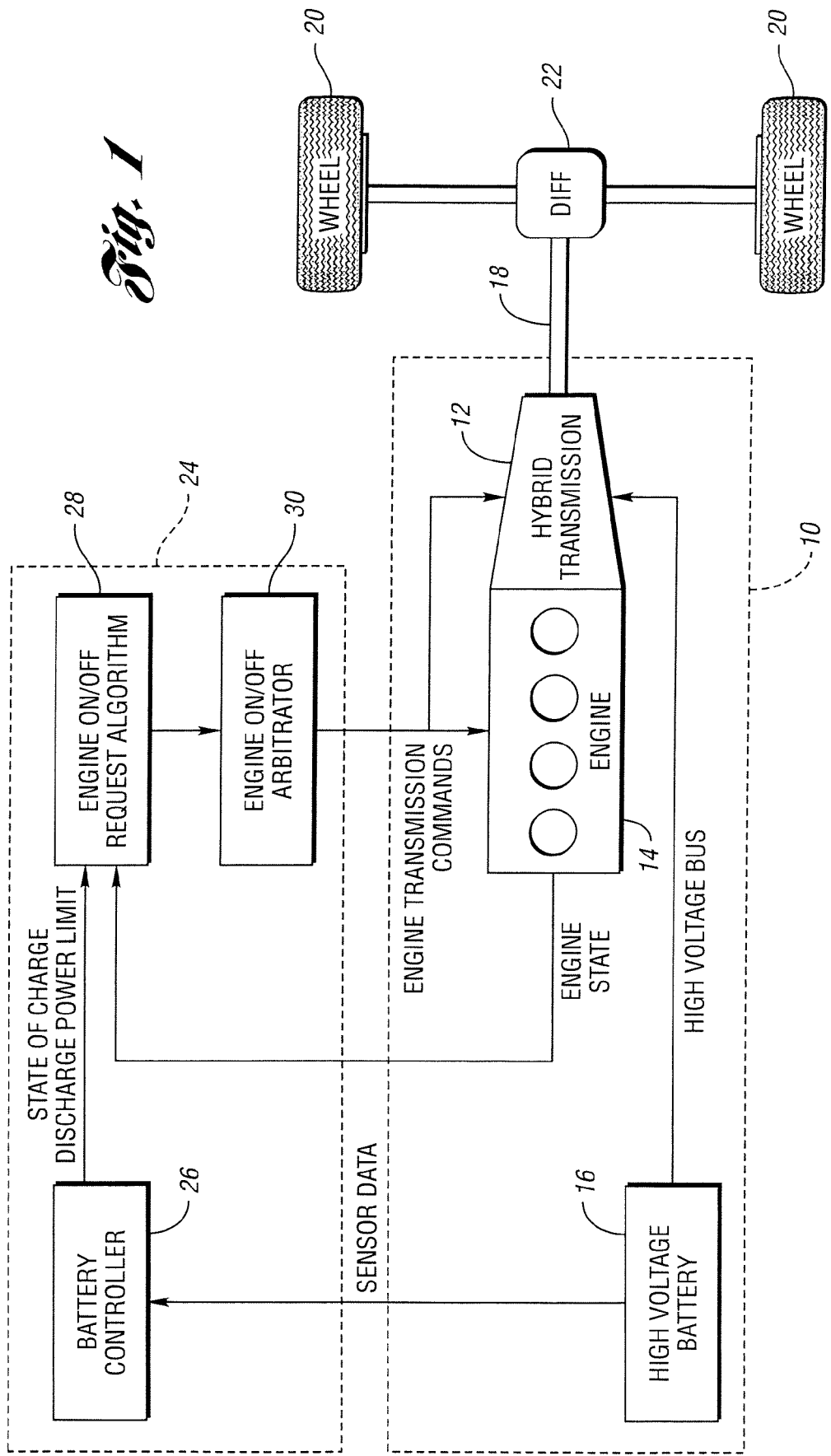
FIG. 1 is a schematic representation of a parallel/series powertrain system configuration incorporating the features of the invention.

Referring now to the drawings and initially to FIG. 1, a hybrid electric vehicle is generally depicted at 10 and includes a powertrain that may be any of the well known HEV configurations. One example is the PSHEV configuration shown and described in U.S. patent application Ser. No. 10/248,886 filed Feb. 27, 2003, assigned to the assignee of the present invention and incorporated herein by reference. The powertrain includes a transmission 12 that is coupled to an internal combustion engine 14 and a high voltage battery 16 that act as power inputs sources. It will be understood that the source 14 is illustrated as an internal combustion engine but other sources such as a fuel cell system may be used as is known in the art. Likewise, the source 16 is illustrated as a battery but other sources such as an ultra capacitor may be used as is known in the art. A torque output shaft 18 of the transmission 12 is drivably connected to vehicle traction wheels 20 through a differential and axle mechanism 22. Of course, the present invention is also applicable to four wheel drive systems in which all of the wheels 20 are driven.

A vehicle system controller generally designated 24 such as disclosed in the aforementioned application, interprets the driver demand for power and determines when and how much torque each power input source needs to provide to the transmission to meet the driver power demand and to achieve specified vehicle performance. In accordance with the present invention the controller 24 further includes a battery controller 26 that responds to battery sensor inputs and provides outputs such as battery SOC and battery DPL to a state machine implementing an engine ON/OFF request algorithm indicated at 28 that is described in greater detail hereinafter. An engine ON/OFF arbitrator 30 receives requests from the state machine as well as from various other sources and issues an engine ON/OFF command based on a priority scheme that evaluates the various requests.

Figure 2:
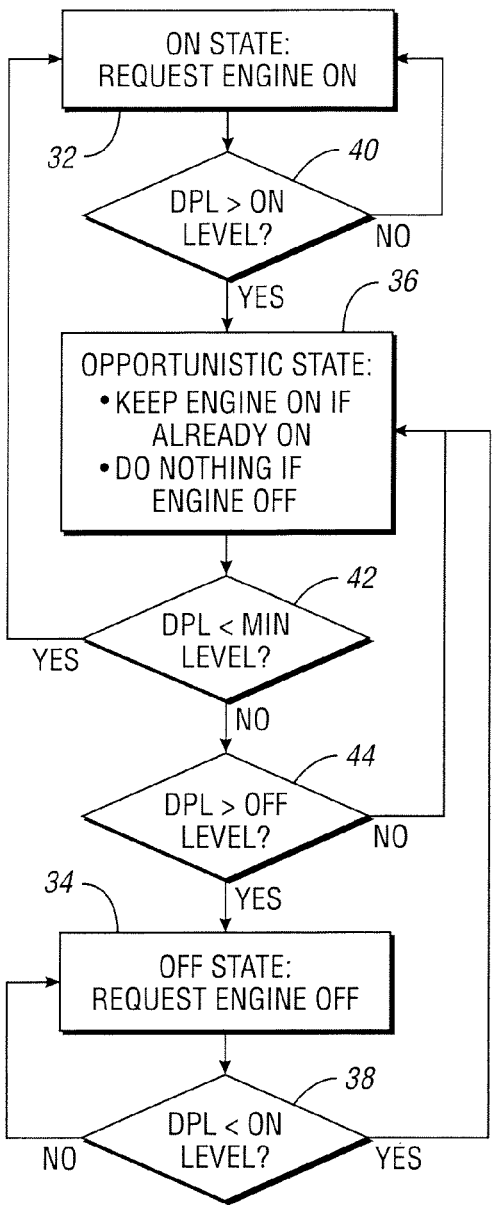
FIG. 2 is a state diagram using battery discharge power level relative to a set of threshold levels for initiating changes in the condition of a state machine implementation of the invention.
Figure 3:
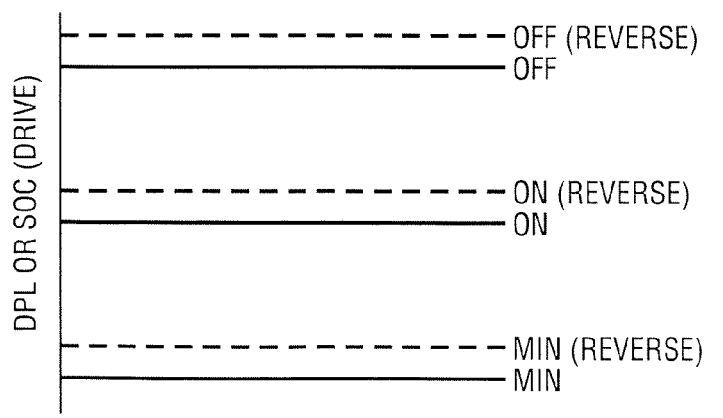
FIG. 3 shows the relative positions of the threshold levels used in the present invention for drive and reverse transmission positions respectively.

Referring now to FIG. 2, a flow chart of the operation of the engine ON/OFF request algorithm as a function of the battery DPL is shown. The state machine has three states, namely ON, OFF and OPPORTUNISTIC as indicated by the numerals 32, 34 and 36 respectively. In the ON state 32 the machine makes a request to the arbitrator 30 that the engine be turned on. In the OFF state 34 the machine makes a request to the arbitrator 30 that the engine be turned off, or alternatively the request may be that it is OK to turn the engine off. In the OPPORTUNISTIC state 36 the machine makes a request to the arbitrator 30 that the engine be kept on if the engine is already on. If the engine is off and the machine is in the OPPORTUNISTIC state 36 then a DON'T CARE request is made to the arbitrator 30. Transition between the various states of the machine is dependent on the value of the DPL of the battery relative to three threshold levels and the present state of the machine. The three threshold levels and their relative positions are shown in FIG. 3. The three threshold levels are identified as MIN, ON, and OFF. The MIN and OFF levels are respectively below and above the ON level.

The set of threshold levels shown in solid lines in FIG. 3, represent calibratable values of DPL when the vehicle transmission is in drive position while the set of threshold levels shown in dotted lines represent such values when the vehicle transmission is in reverse drive mode. The respective levels of the threshold values for reverse transmission drive mode are greater than the corresponding values for drive transmission position to accommodate the higher DPL or SOC required in the reverse drive mode. The three threshold levels are calibratable and their values depending upon the energy storage device being used and the vehicle configuration. For example, a 10 kWatt battery may need set points of 2, 4, 6 for the MIN, ON and OFF levels respectively whereas a 50 kWatt battery may need set points as 30, 35, 40. For battery SOC, the numbers would be in percentage terms. For battery DPL, the numbers would be in terms of power.

Returning to FIG. 2, and assuming that the machine is in the OFF state 34, if the DPL is greater than the ON threshold level then the state of the machine remains in the OFF state 34 as indicated by the NO path from the decision block 38. In the OFF state the state machine makes a request to the arbitrator 30 that the engine be turned off. On the other hand, if the machine is in the OFF state and the DPL is less than the ON threshold level then the machine transition from the OFF state to the OPPORTUNISTIC state 36 as indicated by the YES path from the decision block 38.

If the state machine is in the ON state 32 and the DPL is less than the ON threshold level then the machine remains in the ON state 32 as indicated by the NO path from the decision block 40. On the other hand, if the DPL is greater than the ON threshold level then the machine transition from the ON state 32 to the OPPORTUNISTIC state 36 as indicated by the YES path from the decision block 40.

If while the machine is in the OPPORTUNISTIC state, the DPL drops below the MIN level, the machine transitions from the OPPORTUNISTIC state 36 to the ON state 32 and a request is made to the arbitrator 30 that the engine be turned on as indicated by the YES path from the decision block 42. If instead the DPL is greater than the MIN level, as indicated by the NO path from the decision block 42, and the DPL is greater than the OFF level, the machine transitions to the OFF state as indicated by the YES path from the decision block 44 and a request is made to the arbitrator 30 that the engine be turned off. If the DPL is greater than the MIN threshold level but less than the OFF threshold level as indicated by the NO path from the decision block 44 then the machine remains in the OPPORTUNISTIC state 36.

Figure 4:
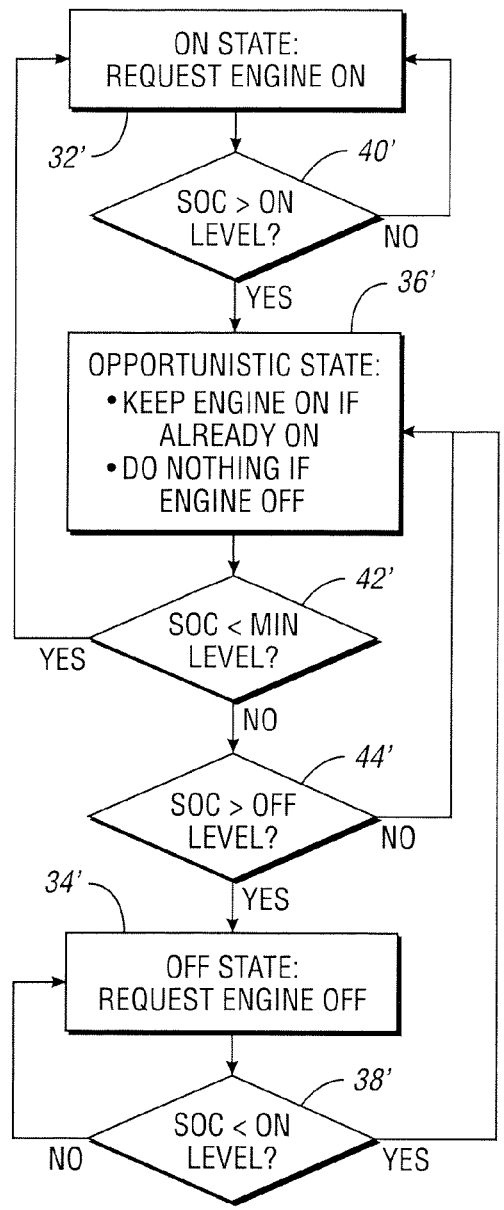
FIG. 4 is a state diagram using battery SOC relative to a set of threshold levels for initiating changes in the condition of a state machine implementation of the invention.

In FIG. 4 the operation of the state machine in response to changes in battery SOC is shown and follows the same data flow as in FIG. 2. The blocks in the flowchart of FIG. 4 corresponding to those in FIG. 2 are designated with prime numbers. Accordingly, the machine remains in the ON state and requests that the engine be turned on as long as the SOC is less than the ON level. The machine transitions from the ON state to the OPPORTUNISTIC state if the SOC exceeds the ON level. Likewise, the machine remains in the OFF state and requests that the engine be turned off as long as the SOC is greater than the ON level. The machine transitions from the OFF state to the OPPORTUNISTIC state if the SOC drops below the ON level. The machine will remain in the OPPORTUNISTIC state as long as the SOC is greater than the MIN level but less than the OFF level and will transition from the OPPORTUNISTIC state to the ON state if the SOC exceeds the OFF level.

It will be apparent to those skilled in the art that modifications may be made to the embodiment of the disclosed invention without departing from the scope of the invention. All such modifications and equivalents thereof are intended to be covered by the following claims.

The invention claimed is:

1. A method of controlling a hybrid electric vehicle powertrain having a power unit, an energy storage battery, and a controller responding to powertrain operating parameters including discharge power limit (DPL) and battery state of charge (SOC), the controller including a state machine having a plurality of states and an arbitrator for effecting a response to state machine change requests in accordance with the powertrain operating parameters, the method comprising a sequence of the following steps:
   (a) monitoring the powertrain operating parameters;
   (b) determining the values of the discharge power limit (DPL) and the state of charge (SOC) of the energy storage battery;
   (c) if the state machine is in an OFF state, which requests that the power unit be off, and the DPL is less than an ON level, causing the state machine to transition from the OFF state to an OPPORTUNISTIC state, which requests that the power unit be kept on if already on;
   (d) if the state machine is in an ON state, which requests that the power unit be on, and the DPL is greater than the ON level, causing the state machine to transition from the ON state to the OPPORTUNISTIC state;
   (e) if the state machine is in the OPPORTUNISTIC state and the DPL is less than a MIN level, the MIN level being less than the ON level, causing the state machine to transition from the OPPORTUNISTIC state to the ON state; and
   (f) if the state machine is in the OPPORTUNISTIC state and the DPL is greater than an OFF level, the OFF level being greater than the ON level, causing the state machine to transition from the OPPORTUNISTIC state to the OFF state.

2. A method of controlling a hybrid electric vehicle powertrain having a power unit, an energy storage battery, and a controller responding to powertrain operating parameters including discharge power limit (DPL) and battery state of charge (SOC), the controller including a state machine having a plurality of states and an arbitrator for effecting a response to state machine change requests in accordance with the powertrain operating parameters, the method comprising a sequence of the following steps:
   (a) monitoring the powertrain operating parameters;
   (b) determining the values of the discharge power limit (DPL) and the state of charge (SOC) of the energy storage battery;
   (c) if the state machine is in an OFF state, which requests that the power unit be off, and the SOC is less than an ON level, causing the state machine to transition from the OFF state to an OPPORTUNISTIC state, which requests that the power unit be kept on if already on;
   (d) if the state machine is in an ON state, which requests that said power unit be on, and the SOC is greater than the ON level, causing the state machine to transition from the ON state to the OPPORTUNISTIC state;
   (e) if the state machine is in the OPPORTUNISTIC state and the SOC is less than a MIN level, the MIN level being less than the ON level, causing the state machine to transition from the OPPORTUNISTIC state to the ON state; and
   (f) if the state machine is in the OPPORTUNISTIC state and the SOC is greater than an OFF level, the OFF level being greater than the ON level, causing the state machine to transition from the OPPORTUNISTIC state to the OFF state.

3. A method of controlling a hybrid electric vehicle powertrain having a power unit, an energy storage battery, and a controller responding to powertrain operating parameters including discharge power limit (DPL) and battery state of charge (SOC), the controller including a state machine having a plurality of states and an arbitrator for effecting a response to state machine change requests in accordance with the powertrain operating parameters, the method comprising a sequence of the following steps:
   (a) monitoring the powertrain operating parameters;
   (b) determining the values of the discharge power limit (DPL) and the state of charge (SOC) of the energy storage battery;
   (c) if the state machine is in an OFF state, which requests that the power unit be off, and the DPL or SOC is less than an ON level, causing the state machine to transition from the OFF state to an OPPORTUNISTIC state, which requests that the power unit be kept on if already on;
   (d) if the state machine is in an ON state, which requests that said power unit be on, and the DPL or SOC is greater than the ON level, causing the state machine to transition from the ON state to the OPPORTUNISTIC state;
   (e) if the state machine is in the OPPORTUNISTIC state and the DPL or SOC is less than a MIN level, the MIN level being less than the ON level, causing the state machine to transition from the OPPORTUNISTIC state to the ON state; and
   (f) if the state machine is in the OPPORTUNISTIC state and the DPL or SOC is greater than an OFF level, the OFF level being greater than the ON level, causing the state machine to transition from the OPPORTUNISTIC state to the OFF state.

4. A method of controlling a hybrid electric vehicle powertrain having a power unit, an energy storage battery, and a controller responding to powertrain operating parameters including discharge power limit (DPL) and battery state of charge (SOC), the controller including a state machine having a plurality of states and an arbitrator for effecting a response to state machine change requests in accordance with the powertrain operating parameters, the method comprising a sequence of the following steps:
   (a) monitoring the powertrain operating parameters;
   (b) determining the values of the discharge power limit (DPL) and the state of charge (SOC) of the energy storage battery;
   (c) if the state machine is in an OFF state, which requests that the power unit be off, and the DPL is less than an ON level, causing the state machine to transition from the OFF state to an OPPORTUNISTIC state, which requests that the power unit be kept on if already on;
   (d) if the state machine is in an ON state, which requests that the power unit be on, and the DPL is greater than the ON level, causing the state machine to transition from the ON state to the OPPORTUNISTIC state;
   (e) if the state machine is in the OPPORTUNISTIC state and the DPL is less than a MIN level, the MIN level being less than the ON level, causing the state machine to transition from the OPPORTUNISTIC state to the ON state; and (f) if the state machine is in the OPPORTUNISTIC state and the DPL is greater than an OFF level, the OFF level being greater than the ON level, causing the state machine to transition from the OPPORTUNISTIC state to the OFF state;

wherein the step of monitoring the powertrain operating parameters includes monitoring the drive mode of the powertrain to determine whether it is in reverse drive or forward drive, the ON level and the OFF level being dependent on the drive mode of a vehicle transmission.

5. A method of controlling a hybrid electric vehicle having a power unit, an energy storage battery, a transmission, and a controller including a state machine having a plurality of states including an ON state, which requests that said power unit be on, an OFF state, which requests that said power unit be off, and an OPPORTUNISTIC state, which requests that said power unit be kept on if already on, the method comprising a sequence of the following steps:

(a) determining the values of a discharge power limit (DPL) and a state of charge (SOC) of the energy storage battery;

(b) if the state machine is in the ON state and the DPL or SOC is greater than an ON level, causing said machine to transition from the ON state to the OPPORTUNISTIC state;

(c) if the state machine is in said OFF state and the DPL or SOC is less than an ON level, causing the state machine to transition from the OFF state to the OPPORTUNISTIC state;

(d) if the state machine is in the OPPORTUNISTIC state and the DPL or SOC is less than a MIN level, wherein the MIN level is less than the ON level, causing the state machine to transition from the OPPORTUNISTIC state to the ON state; and (e) if said machine is in the OPPORTUNISTIC state and the DPL or SOC is greater than an OFF level, wherein the OFF level is greater than the ON level, causing the state machine to transition from the OPPORTUNISTIC state to the OFF state.

* * * * *